United States Patent
Yoshioku

(10) Patent No.: US 10,810,383 B2
(45) Date of Patent: Oct. 20, 2020

(54) IMAGE PROCESSING APPARATUS FOR COMPARING DOCUMENTS IN DIFFERENT LANGUAGES

(71) Applicant: KYOCERA Document Solutions Inc., Osaka (JP)

(72) Inventor: Shinobu Yoshioku, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 105 days.

(21) Appl. No.: 16/216,409

(22) Filed: Dec. 11, 2018

(65) Prior Publication Data
US 2019/0188267 A1   Jun. 20, 2019

(30) Foreign Application Priority Data
Dec. 15, 2017 (JP) .................. 2017-241113

(51) Int. Cl.
| | |
|---|---|
| *G06F 40/58* | (2020.01) |
| *G06K 9/00* | (2006.01) |
| *G06F 3/12* | (2006.01) |
| *G06F 40/194* | (2020.01) |
| *G06F 40/51* | (2020.01) |
| *G06K 15/02* | (2006.01) |
| *G06F 3/041* | (2006.01) |

(Continued)

(52) U.S. Cl.
CPC ............ *G06F 40/58* (2020.01); *G06F 3/0412* (2013.01); *G06F 3/0482* (2013.01); *G06F 3/12* (2013.01); *G06F 3/1244* (2013.01); *G06F 40/194* (2020.01); *G06K 9/00442* (2013.01); *G06K 15/1835* (2013.01); *G06T 11/60* (2013.01); *G06F 40/51* (2020.01); *G06K 2209/01* (2013.01)

(58) Field of Classification Search
CPC . G06F 3/12; G06F 40/51; G06F 40/58; G06F 40/194; G06K 2209/01; G06K 9/00483; G06K 9/00442
USPC .......................................................... 704/3
See application file for complete search history.

(56) References Cited

U.S. PATENT DOCUMENTS

| | | | | |
|---|---|---|---|---|
| 6,047,299 A | * | 4/2000 | Kaijima ................ | G06F 40/232 715/236 |
| 6,560,620 B1 | * | 5/2003 | Ching .................... | G06F 40/20 715/229 |

(Continued)

FOREIGN PATENT DOCUMENTS

| | | |
|---|---|---|
| JP | 2004-199483 A | 7/2004 |
| JP | 2012-118883 A | 6/2012 |
| JP | 2014-137613 A | 7/2014 |

*Primary Examiner* — James S Wozniak
(74) *Attorney, Agent, or Firm* — IP Business Solutions, LLC

(57) ABSTRACT

An image processing apparatus includes a control unit. The control unit acts as a searcher, a translator, a comparator, and an outputter. The searcher searches a first file and a second file, each including a text that is different in language from each other. The translator generates a translated text of the second file, by translating the text in the second file into a same language as a language of the text in the first file. The comparator compares between the text in the first file and the translated text generated from the second file, and detects a difference between the text of the first file and the text of the second file, through the comparison. The outputter outputs the difference detected by the comparator.

9 Claims, 12 Drawing Sheets

(51) Int. Cl.
  *G06F 3/0482* (2013.01)
  *G06T 11/60* (2006.01)

(56) References Cited

U.S. PATENT DOCUMENTS

| | | | | |
|---|---|---|---|---|
| 6,598,015 B1* | 7/2003 | Peterson | G06F 40/45 | 704/3 |
| 8,892,596 B1* | 11/2014 | Semturs | G06F 16/958 | 707/769 |
| 2003/0040899 A1* | 2/2003 | Ogilvie | G06F 40/58 | 704/2 |
| 2003/0083860 A1* | 5/2003 | Abir | G06F 40/44 | 704/7 |
| 2004/0223648 A1* | 11/2004 | Hoene | G06F 40/194 | 382/218 |
| 2005/0267734 A1* | 12/2005 | Masuyama | G06F 40/45 | 704/2 |
| 2006/0080080 A1* | 4/2006 | Yamashita | G06F 40/45 | 704/3 |
| 2011/0110599 A1* | 5/2011 | Sata | G06F 40/58 | 382/229 |
| 2011/0197121 A1* | 8/2011 | Kletter | G06F 40/166 | 715/234 |
| 2011/0246173 A1* | 10/2011 | Li | G06F 40/45 | 704/2 |
| 2012/0110434 A1* | 5/2012 | Gorthi | G06Q 10/06 | 715/234 |
| 2012/0116750 A1* | 5/2012 | Onishi | G06F 40/58 | 704/3 |
| 2012/0310955 A1* | 12/2012 | Uszkoreit | G06Q 30/0251 | 707/754 |
| 2013/0156447 A1* | 6/2013 | Eiki | G03G 15/2053 | 399/33 |
| 2016/0055196 A1* | 2/2016 | Collins | G06F 40/197 | 707/690 |
| 2016/0217343 A1* | 7/2016 | Hoffman | G06K 9/6218 | |
| 2016/0224548 A1* | 8/2016 | Massand | G06F 16/93 | |
| 2016/0241735 A1* | 8/2016 | Nakano | G02B 13/0005 | |
| 2018/0203928 A1* | 7/2018 | Ching | G06F 16/316 | |
| 2018/0260363 A1* | 9/2018 | Takumi | G06F 40/106 | |
| 2018/0349332 A1* | 12/2018 | Indenbom | G06F 40/117 | |
| 2019/0042628 A1* | 2/2019 | Rajpara | G06F 16/93 | |
| 2019/0138626 A1* | 5/2019 | Nguyen | G06F 16/2365 | |
| 2019/0205400 A1* | 7/2019 | Puzicha | H04L 51/18 | |
| 2019/0228063 A1* | 7/2019 | El-Sherif | G06F 7/00 | |
| 2019/0236102 A1* | 8/2019 | Wade | G06F 16/901 | |
| 2020/0117893 A1* | 4/2020 | Whelan | G06K 9/00483 | |

\* cited by examiner

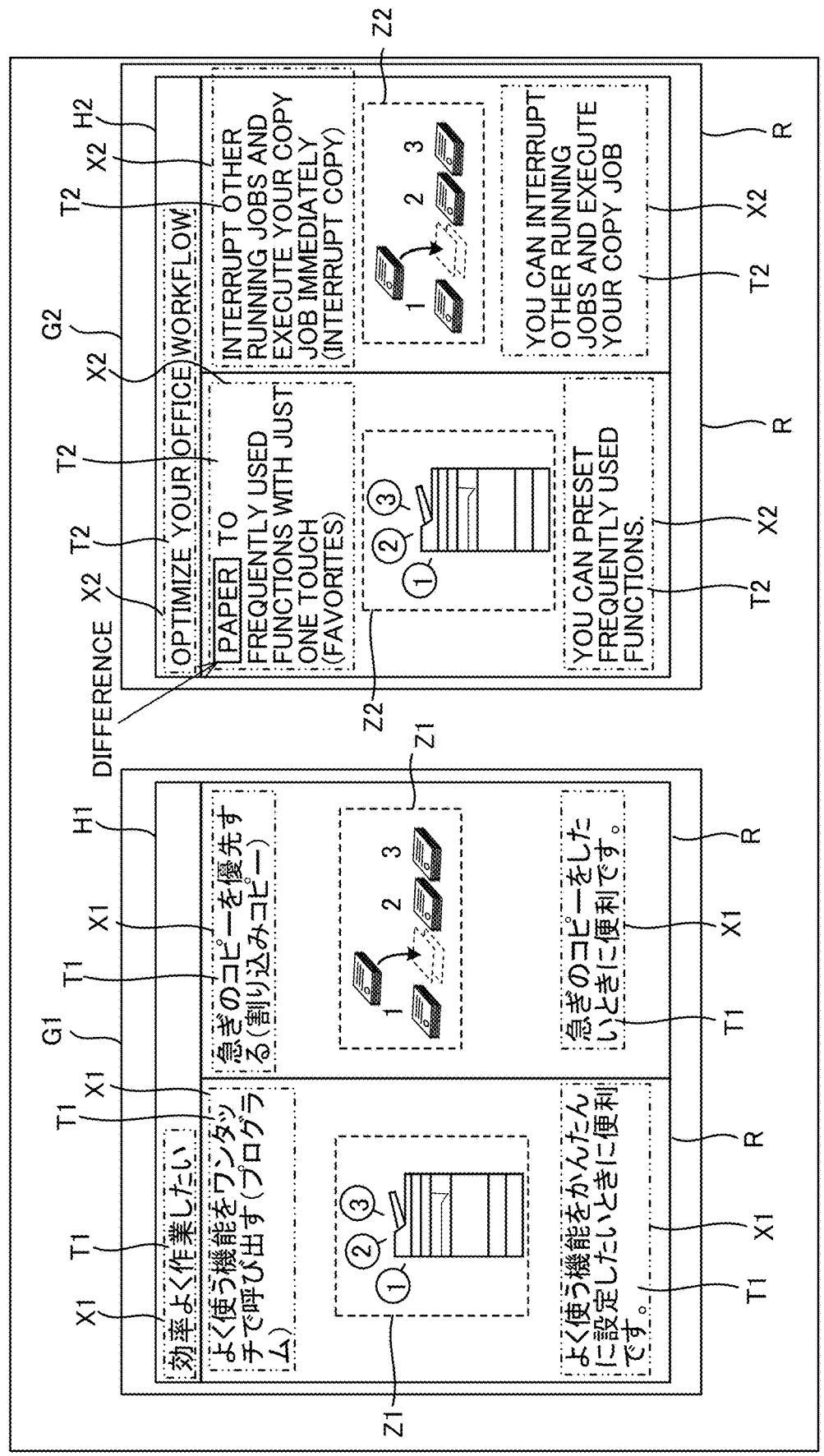

IMAGE PROCESSING APPARATUS FOR COMPARING DOCUMENTS IN DIFFERENT LANGUAGES

INCORPORATION BY REFERENCE

This application claims priority to Japanese Patent Application No. 2017-241113 filed on Dec. 15, 2017, the entire contents of which are incorporated by reference herein.

BACKGROUND

The present disclosure relates to an image processing apparatus having a text translation function, and more particularly to a technique to compare between texts that are different in language from each other.

A technique to detect and present, for example when composing a parallel translation by editing a translated text produced by machine translation, a word in the original text that is likely to be omitted in the translation process, has been known.

In addition, a technique has been developed to detect, in addition to outputting an image for printing, for example a grammatical error, if any, in the characters included in the image to be printed, and point out the error by adding an indication to the outputted image.

Further, a technique to collate, compare, and combine correspondences between words or word strings included in a plurality of translation results, has been known.

SUMMARY

The disclosure proposes further improvement of the foregoing technique.

In an aspect, the disclosure provides an image processing apparatus including a control unit. The control unit includes a processor, and acts as a searcher, a translator, a comparator, and an outputter, when the processor executes a control program. The searcher searches a first file and a second file, each including a text that is different in language from each other. The translator generates a translated text of the second file, by translating the text in the second file into a same language as a language of the text in the first file. The comparator compares between the text in the first file and the translated text generated from the second file, and detects a difference between the text of the first file and the text of the second file, through the comparison. The outputter executes a process for outputting the difference detected by the comparator.

BRIEF DESCRIPTION OF THE DRAWINGS

FIG. 7 is a schematic drawing showing still another example of a source image stored in the first file, and a source image stored in the second file.

DETAILED DESCRIPTION

Hereafter, an embodiment of the disclosure will be described, with reference to the drawings.

Figure 1:
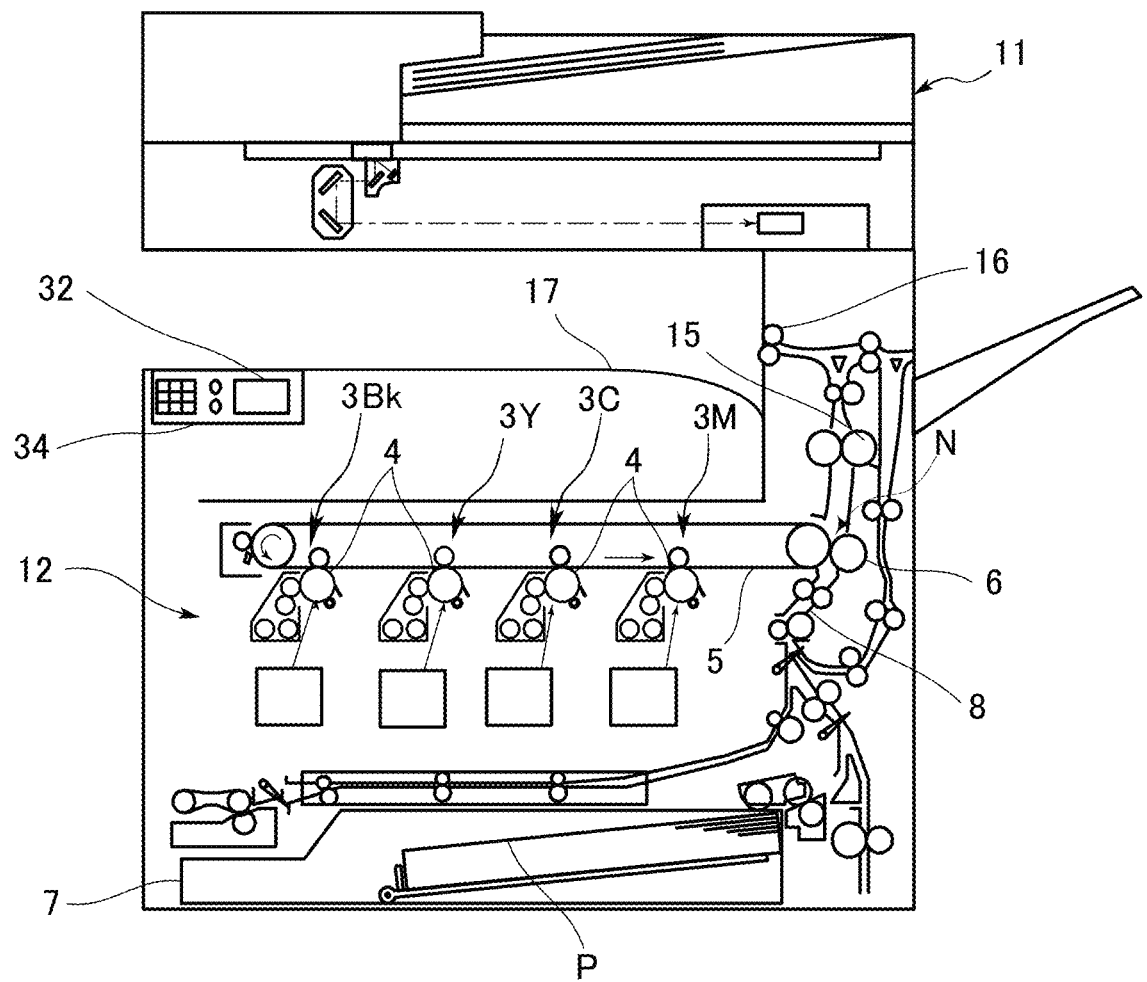
FIG. 1 is a cross-sectional view showing an image forming apparatus incorporated with an image processing apparatus according to an embodiment of the disclosure.

FIG. 1 is a cross-sectional view showing an image forming apparatus incorporated with an image processing apparatus according to the embodiment of the disclosure. The image forming apparatus 10 is a multifunction peripheral (MFP) configured to execute a plurality of functions including, for example, a copying function, a printing function, a scanning function, and a facsimile function. The image forming apparatus 10 includes an image reading unit 11 and an image forming unit 12.

The image reading unit 11 includes a scanner for optically reading a source document, and generates image data representing the image of the source document, by converting an analog signal outputted from an image sensor of the scanner, into a digital signal.

The image forming unit 12 is configured to print an image based on the image data generated by the image reading unit 11 or received from outside, on a recording sheet, and includes an image forming subunit 3M for magenta, an image forming subunit 3C for cyan, an image forming subunit 3Y for yellow, and an image forming subunit 3Bk for black. In each of the image forming subunits 3M, 3C, 3Y, and 3Bk, the surface of a photoconductor drum 4 is uniformly charged, and an electrostatic latent image is formed on the surface of the photoconductor drum 4 by exposure. Then the electrostatic latent image on the surface of the photoconductor drum 4 is developed into a toner image, and the toner image on the photoconductor drum 4 is transferred to an intermediate transfer roller 5. Thus, the color toner image is formed on the intermediate transfer roller 5. The color toner image is transferred to the recording sheet P transported along a transport route 8 from a paper feed unit 7, at a nip region N defined between the intermediate transfer roller 5 and a secondary transfer roller 6.

Thereafter, the recording sheet P is press-heated in a fixing device 15, so that the toner image on the recording sheet P is fixed by thermal compression, and then the recording sheet P is discharged to an output tray 17 through a discharge roller pair 16.

Figure 2:
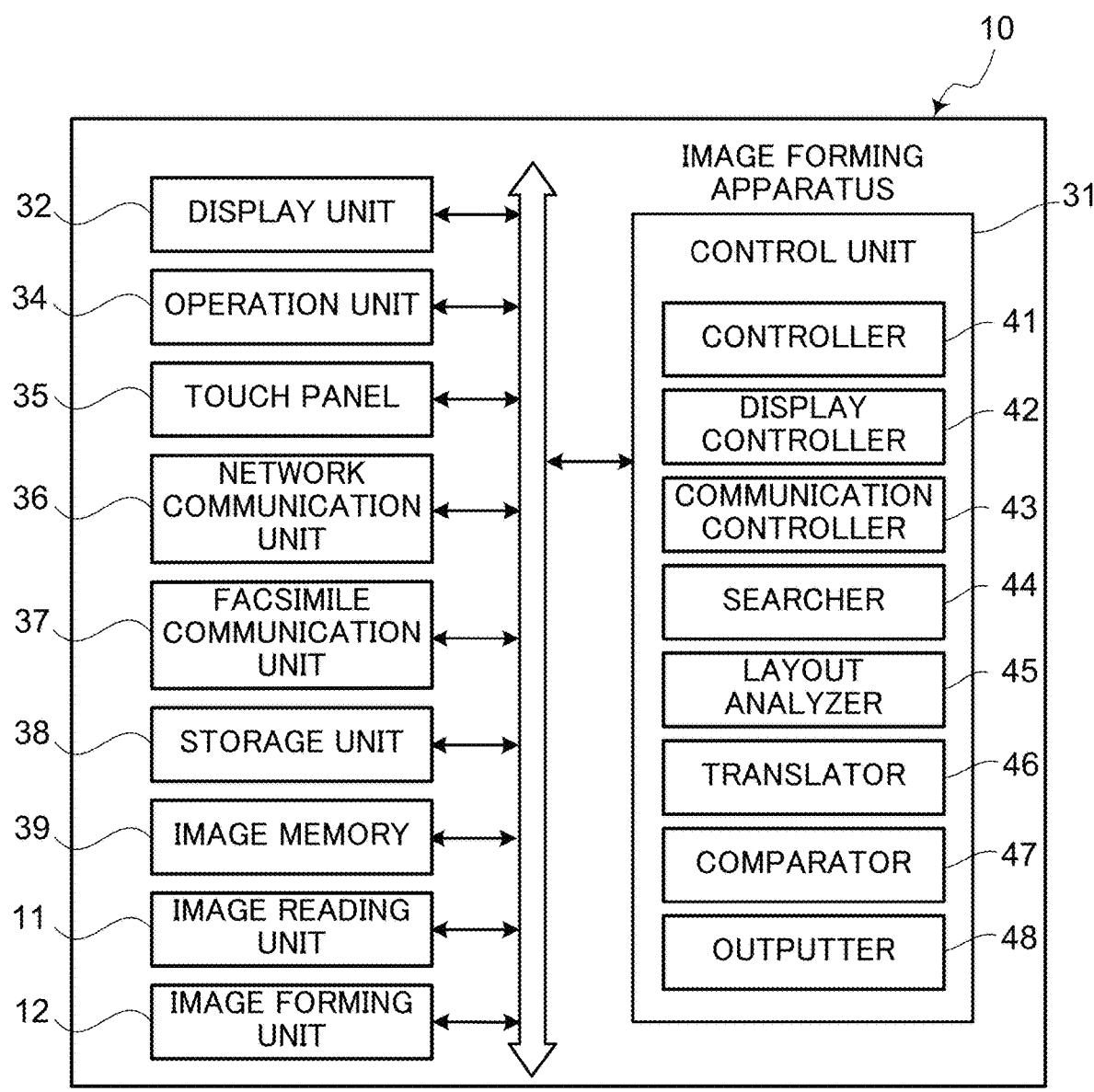
FIG. 2 is a block diagram showing an essential internal configuration of the image forming apparatus according to the embodiment.

FIG. 2 is a block diagram showing an essential internal configuration of the image forming apparatus 10. As shown in FIG. 2, the image forming apparatus 1 includes a control unit 31, a display unit 32, an operation unit 34, a touch panel 35, a network communication unit 36, a facsimile communication unit 37, a storage unit 38, an image memory 39, the image reading unit 11, and the image forming unit 12. The mentioned components are configured to transmit and receive data or signals to and from each other, via a bus.

The display unit 32 is, for example, constituted of a liquid crystal display (LCD) or an organic light-emitting diode (OLED) display.

The operation unit 34 includes arrow keys for moving, for example, a focus in a GUI displayed on the display unit 32, an enter key for confirming the operation with respect to the GUI, s start key, and so forth. The operation unit 34 serves as a unit for inputting the user's instruction.

The touch panel 35 is overlaid on the screen of the display unit 32. The touch panel 35 is based on a resistive film or electrostatic capacitance, and configured to detect a contact (touch) of the user's finger, along with the touched position, to input the user's instruction to, for example, the GUI on the screen of the display unit 32. Accordingly, the touch panel 35 serves as an operation unit for inputting the user's instruction, according to the operation performed by the user on the screen of the display unit 32.

The network communication unit 36 transmits and receives various data to and from non-illustrated other terminal devices, through a network. The network communication unit 36 serves as a communication unit that makes communication with the terminal devices through the network. The facsimile communication unit 37 transmits and receives image data to and from non-illustrated other image forming apparatuses or facsimile machines, through the network.

The storage unit 38 includes a large-capacity solid state drive (SSD) or a hard disk drive (HDD), and contains various data and programs.

The image memory 39 temporarily stores image data representing the source image read by the image reading unit 11, image data retrieved from the storage unit 38 by a controller 41, and image data received by the network communication unit 36.

The control unit 31 includes a processor, a random-access memory (RAM), a read-only memory (ROM), and so forth. The processor is, for example, a central processing unit (CPU), a MPU, an ASIC, or the like. The control unit 31 includes the controller 41, a display controller 42, and a communication controller 43, a searcher 44, a layout analyzer 45, a translator 46, a comparator 47, and an outputter 48, each of which performs the function when the processor executes a program stored in the ROM or the storage unit 38. Alternatively, the mentioned components may each be formed of a hardware circuit.

The controller 41 serves to control the overall operation of the image forming apparatus 10. The display controller 42 controls the display unit 32 so as to cause the display unit 32 to display the GUI and various types of information. The communication controller 43 is configured to control the communication operation of the network communication unit 36 and the facsimile communication unit 37.

The searcher 44 searches the storage unit 38 to retrieve a file designated by operating the operation unit 34 or the touch panel 35, or another fill related to the designated file. The searcher 44 also searches a storage on the network to acquire such files, through the communication controller 43 and the network communication unit 36. The storage on the network may be provided by a server, a work station, or a PC.

The layout analyzer 45 performs layout analysis with respect to the source image represented by the image data in the image memory 39, to thereby decide a text region, and image region, or a table region, in the source image. The layout analyzer 45 also extracts a character text from the text region.

The storage unit 38 contains a character database (DB) in which a plurality of character patterns for pattern matching are stored. The layout analyzer 45 converts each of images included in the text region into a character text, with an optical character recognition (OCR) technique. In addition, character patterns are registered in the character database (DB) with respect to a plurality of languages, and therefore the layout analyzer 45 decides, on the basis of the converted character text, the type of the language of the character represented by the character text. Hereinafter, a group of character texts generated by converting a text region in the source image into a character text will be referred to as text.

The translator 46 translates, with respect to two types of texts to be compared, which are different in language from each other, one of the texts into the same language as that of the other, to thereby generate a translated text.

The comparator 47 compares between a given text and a text translated therefrom, which is the object of the comparison with the given text, to thereby detect a difference between those texts.

The outputter 48 outputs a difference in each of the texts, detected by the comparator 47. For example, the outputter 48 causes the image forming unit 12 to form the difference in the text (e.g., an image representing the difference) on the recording sheet, or causes the communication controller 43 and the network communication unit 36 to transmit the difference to a terminal device on the network.

With the image forming apparatus 10 configured as above, for example, when the user selects the copying function by operating the operation unit 34 or the touch panel 35, thus to instruct execution of a copying job, the controller 41 causes the image reading unit 11 to read a source document image, and once stores the image data representing the source image in the image memory 39. Then the controller 41 inputs the image data to the image forming unit 12 from the image memory 39, and causes the image forming unit 12 to print the source document image on the recording sheet.

As another example, the user may instruct, upon selecting a predetermined language joint-writing mode by operating the operation unit 34 or the touch panel 35, to retrieve the first file and the second file containing source images, including texts that are different in language from each other. Here, it will be assumed that at this point the user is aware of the languages used in the first file and the second file, by his/her own judgment.

The searcher 44 searches, according to the mentioned instruction from the user, the storage unit 38 or the storage on the network for the first file and the second file, and stores these files in the image memory 39. Then the layout analyzer 45 extracts a text (a given text) from the source image in the first file, and also extracts a text (text for comparison) from the source image in the second file.

The translator 46 translates the text in the second file into the same language as that of the text in the first file, to thereby generate a translated text of the second file. The comparator 47 compares between the text in the first file and the translated text of the second file, and detects a difference between the text in the first file and the text in the second file.

The outputter 48 outputs the mentioned texts, for example in a joint writing mode, with the detected difference indicated on the text of the first file or on the text of the second file.

Figure 3:
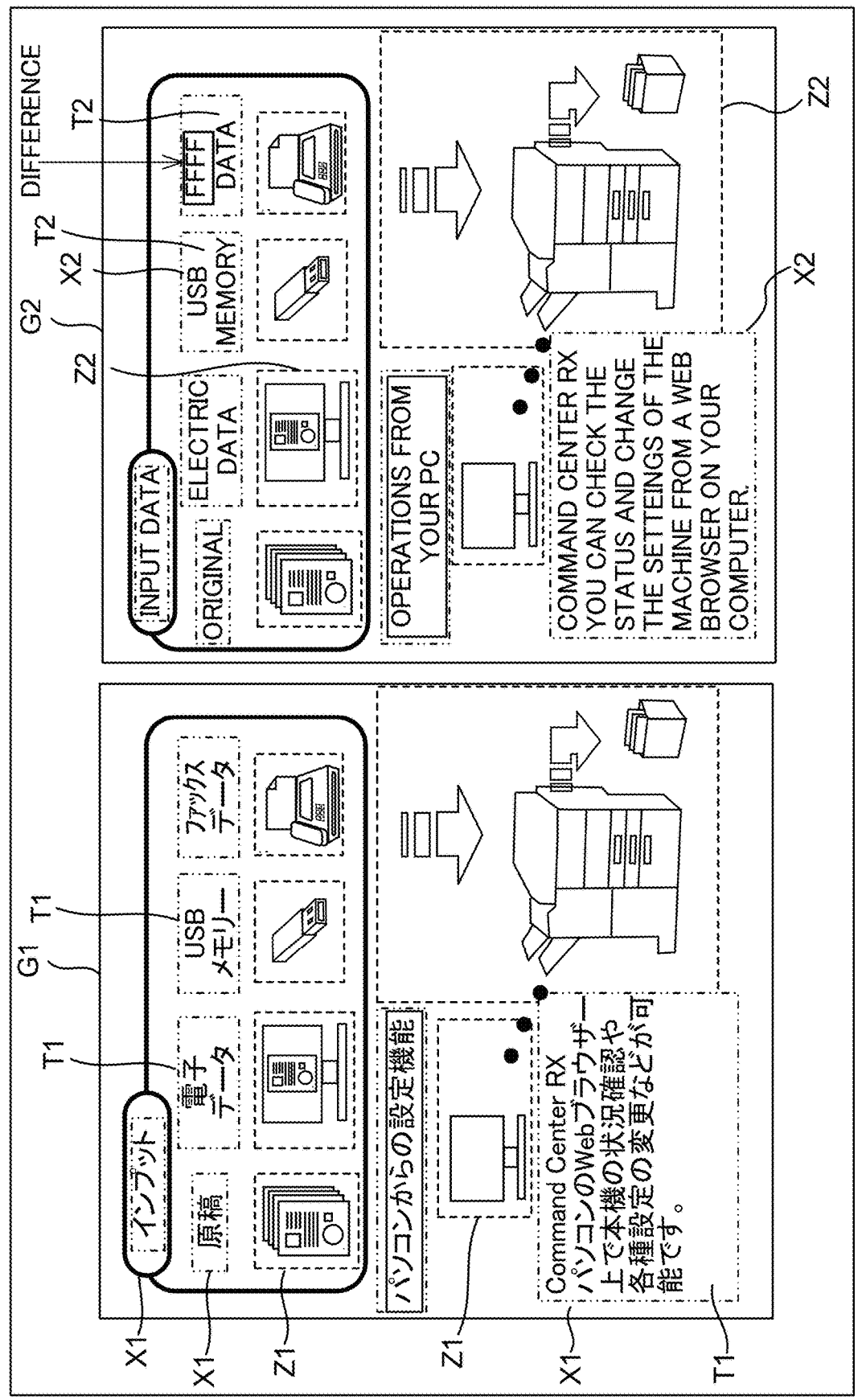
FIG. 3 is a schematic drawing showing an example of a source image stored in a first file, and a source image stored in a second file.

For example, the searcher 44 retrieves from the storage unit 38, or acquires from the storage on the network, the first file including a source image G1 and the second file including a source image G2 shown in FIG. 3, and stores these files in the image memory 39.

The layout analyzer 45 performs layout analysis with respect to the source image G1 in the first file in the image memory 39, and identifies text regions X1 and image regions Z1. The layout analyzer 45 extracts a text T1 composed of a plurality of characters from the text region X1, by the character text conversion, with respect to each of the text regions X1.

The layout analyzer 45 also performs layout analysis with respect to the source image G2 in the second file in the image memory 39, and identifies text regions X2 and image regions Z2, and then extracts a text T2 composed of a plurality of characters from the text region X2, with respect to each of the text regions X2.

Further, the layout analyzer 45 identifies the correspondence between the text T1 in each of the text regions X1 and the text T2 in each of the text regions X2, in other words which of the texts T1 in the text regions X1 and which of the texts T2 in the text regions X2 are to be compared, on the basis of the respective positions of the text regions X1 in the source image G1 in the first file, and the respective positions of the text regions X2 in the source image G2.

Through the analysis performed by the layout analyzer 45, it is identified that, for example as shown in FIG. 3, the source image G1 in the first file includes the plurality of text regions X1 written in Japanese and the plurality of image regions Z1, and that the source image G2 in the second file includes the plurality of text regions X2 written in English and the plurality of image regions Z2.

Although the source image G1 includes the texts T1 in Japanese and the source image G2 includes the texts T2 in English in this example, the Japanese text and the English text are unable to be directly compared. Accordingly, the translator 46 translates the texts T2 in English in the second file into Japanese, which is the language in which the texts T1 in the first file are written, on the basis of the analysis result provided by the layout analyzer 45, and generates the translated text with respect to each of the texts T2 in English in the second file.

The comparator 47 then compares between the text T1 and the translated text generated from the text T2 corresponding to the text T1, with respect to each of the texts T1 in the first file, and detects a difference between the text T1 and the text T2, through the comparison. For example, the comparator 47 extracts a word not included in the text T1 in the first file, from the translated text generated from the text T2 corresponding to the text T1, and extracts the word corresponding to the word extracted as above, from the text T2 in the second file, thus detecting the extracted word as difference. Alternatively, the comparator 47 may extract a word not included in the translated text generated from the text T2 in the second file, from the text T1 in the first file, and detect the extracted word as difference.

The outputter 48 creates an image, for example upon locating the source image G1 and the source image G2 side by side as shown in FIG. 3, in which the difference is indicated on the text T1 in Japanese in the source image G1, or in which the difference is indicated on the text T2 in English in the source image G2. For example, the outputter 48 may create an image in which the word detected as difference in the text T1 or text T2 is underlined or framed, or displayed in a different color from the remaining words.

When a large number of image regions are included in the source image G1 and the source image G2 as shown in FIG. 3, it is preferable that the outputter 48 creates an image in which the source image G1 and the source image G2 are located side by side. In this case, the images of the source image G1 and the source image G2 can be created without compromising the appearance.

When only a small number of image regions are included in the source image G1 and the source image G2, the outputter 48 may extract only the texts T1 in Japanese from the source image G1, and the texts T2 in English from the source image G2 in the joint writing mode, and create an image in which the word detected as difference is underlined or framed, or displayed in a different color from the remaining words, at least in one of the text T1 and the text T2, instead of locating the source image G1 and the source image G2 side by side. Such an arrangement facilitates the comparison between the text T1 and the text T2, compared with the case where the source image G1 and the source image G2 are displayed in mixture.

Figure 4:
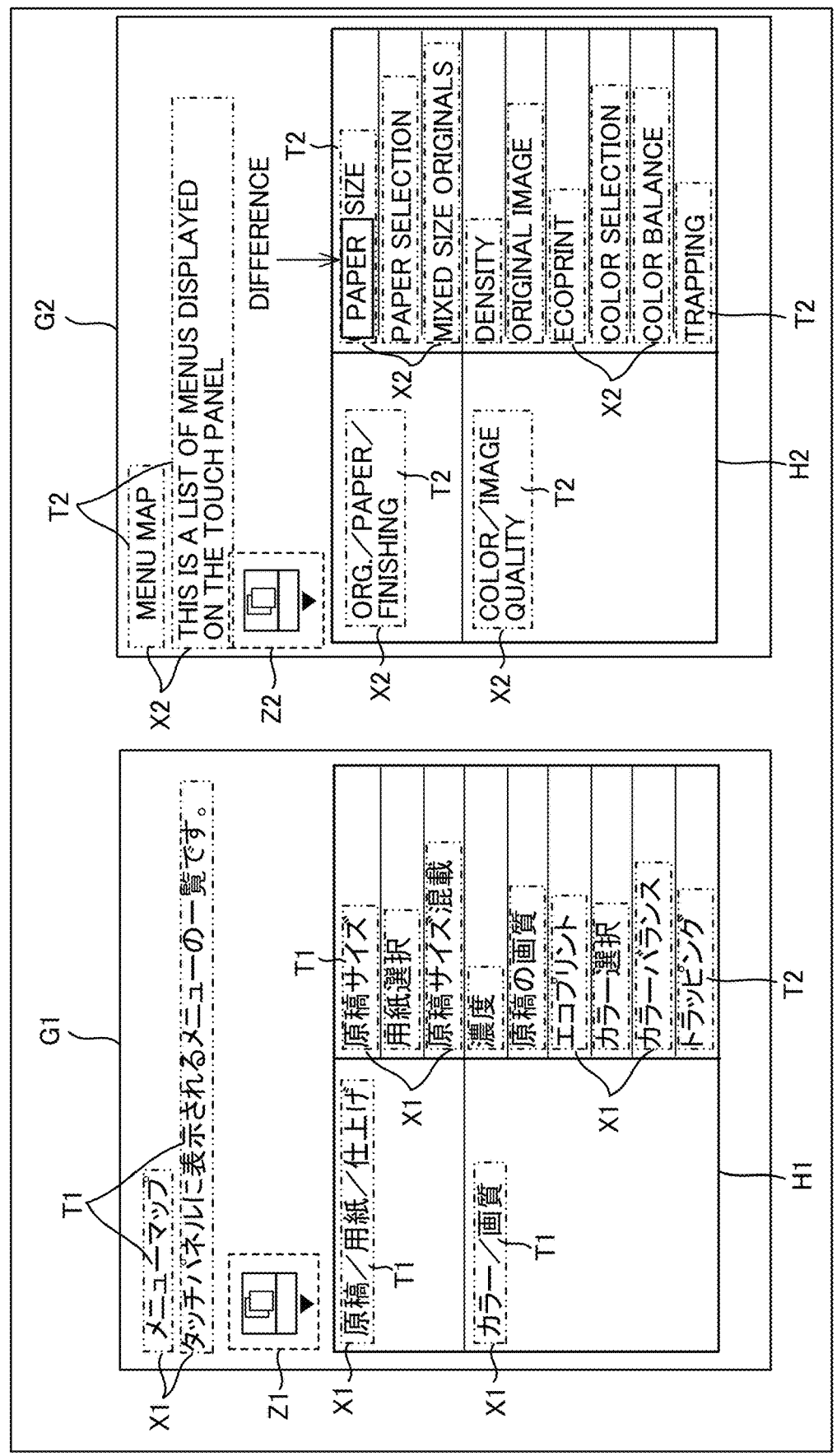
FIG. 4 is a schematic drawing showing another example of a source image stored in the first file, and a source image stored in the second file.

FIG. 4 is a schematic drawing showing another example of the source image in the first file, and the source image in the second file. The source image G1 in the first file includes a table region H1, a plurality of text regions X1 in Japanese, and an image region Z1, and the source image G2 in the second file includes a table region H2, a plurality of text regions X2 in English, and an image region Z2.

In this case also, the searcher 44 retrieves the first file and the second file and stores the files in the image memory 39. The layout analyzer 45 performs layout analysis with respect to the source image G1, and identifies the table region H1, the text regions X1, and the image regions Z1. The layout analyzer 45 also performs layout analysis with respect to the source image G2, and identifies the table region H2, the text regions X2, and the image region Z2. Then the layout analyzer 45 extracts the texts T1 and the texts T2 from the respective text regions X1 and X2, and identifies the correspondence between the text T1 in each of the text regions X1 and the text T2 in each of the text regions X2.

The translator 46 translates the texts T2 in the second file into Japanese, which is the language in which the texts T1 in the first file are written, and generates the respective translated texts. The comparator 47 compares between the text T1 and the translated text generated from the text T2 corresponding to the text T1, with respect to each of the texts T1 in the first file, and detects a difference between the text T1 and the text T2, through the comparison. The outputter 48 creates an image displaying the source image G1 and the source image G2 side by side, in which the word detected as difference is underlined or framed, or displayed in a different color, at least in one of the text T1 and the text T2.

Figure 5A:
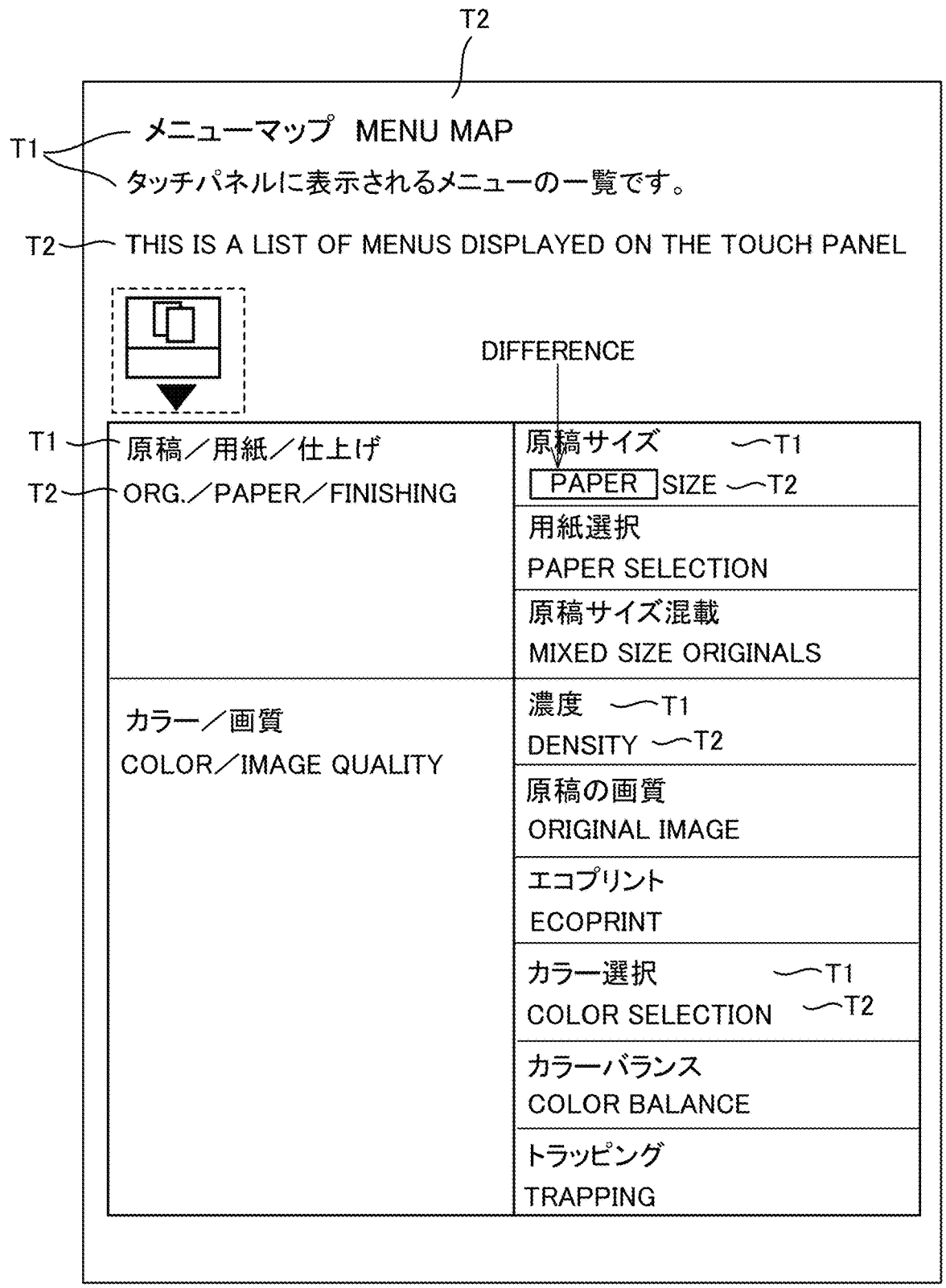
FIG. 5A is a schematic drawing showing Japanese texts in the first file and English texts in the second file, alternately written in pairs.

Alternatively, each of the texts T1 in Japanese in the first file and the corresponding text T2 in English in the second file may be alternately located, so as to constitute a pair as shown in FIG. 5A, instead of displaying the source image G1 in the first file and the source image G2 in the second file, side by side as shown in FIG. 4. In FIG. 5A, the text T1 in Japanese and the text T2 in English corresponding to the text T1 are aligned in the up-down direction as a pair, with respect to each of the texts T1. The outputter 48 may also create an image in which the word detected as difference is underlined or framed, or displayed in a different color, at least in one of the text T1 in Japanese and the text T2 in English. In this case, the outputter 48 creates an image in which each of the texts T1 in Japanese in the first file and the corresponding text T2 in English in the second are alternately located so as to constitute a pair, utilizing the table region and the image region in one of the source image G1 and the source image G2.

Figure 6:
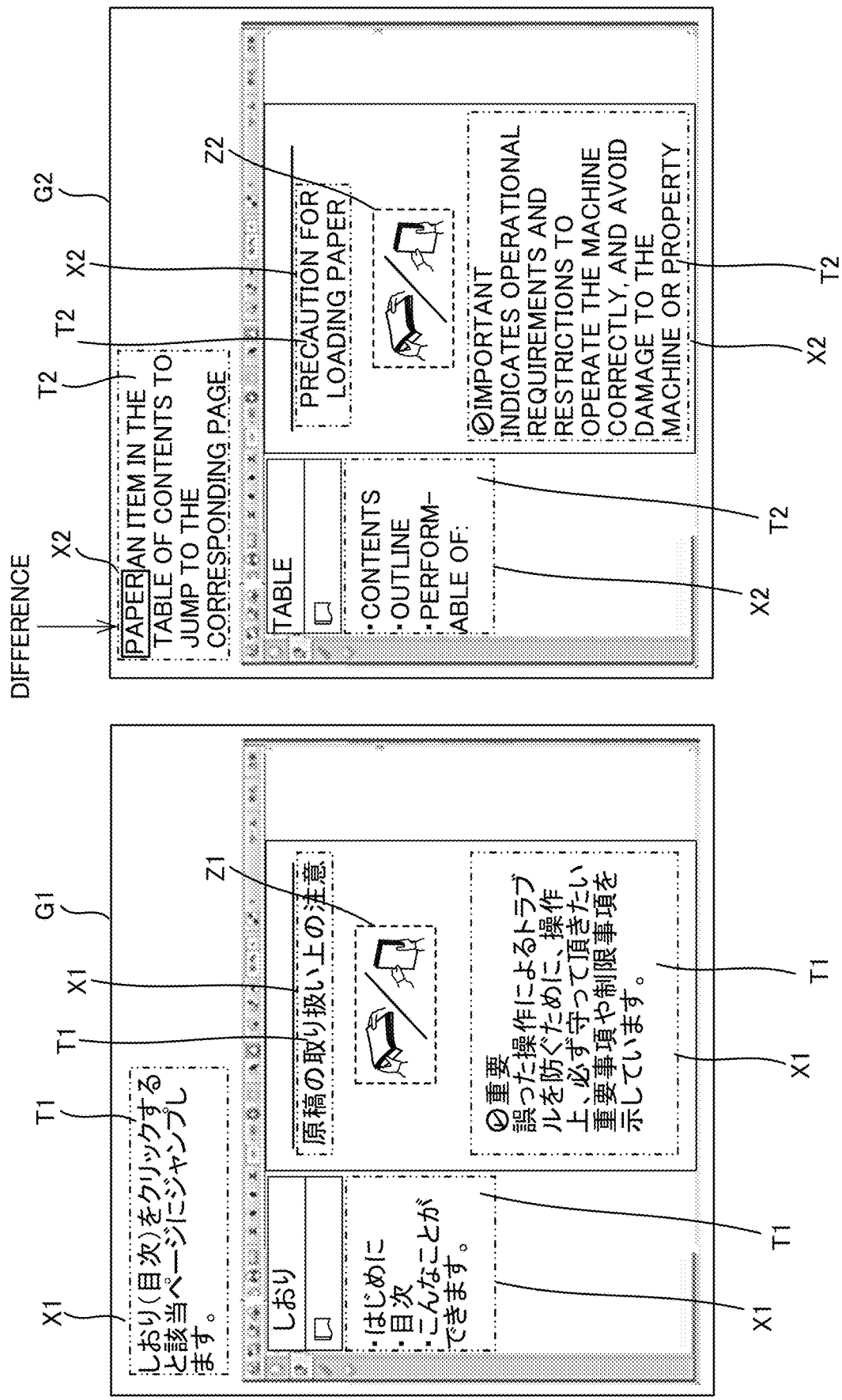
FIG. 6 is a schematic drawing showing still another example of a source image stored in the first file, and a source image stored in the second file.

FIG. 6 is a schematic drawing showing still another example of the source image in the first file, and the source image in the second file. In the example shown in FIG. 6, the outputter 48 is displaying an image in which the source image G1 in the first file and the source image G2 in the second file are located side by side in the horizontal direction, and the word detected as difference is underlined or framed, or displayed in a different color, at least in one of the text T1 in Japanese and the text T2 in English.

When only a small number of image regions are included in the source image G1 and the source image G2, the outputter 48 may extract the texts T1 from the source image G1 and the texts T2 from the source image G2 and display both of the extracted texts, thus omitting the image including the image region, instead of displaying the source image G1 and the source image G2 side by side.

FIG. 7 is a schematic drawing showing still another example of the source image in the first file, and the source image in the second file. In the example shown in FIG. 7, the outputter 48 is displaying an image in which the source image G1 in the first file and the source image G2 in the second file are located side by side in the horizontal direction. In this example, the source image G1 in the first file includes a table region H1 having two display fields R, each of which includes a plurality of text regions X1 in Japanese, and an image regions Z1. Likewise, the source image G2 in the second file includes a table region H2 having two display fields R, each of which includes a plurality of text regions X2 in English, and an image regions Z2. In this example, the outputter 48 creates an image in which the word detected as difference is underlined or framed, or displayed in a different color, at least in one of the text T1 in Japanese and the text T2 in English.

Here, the outputter 48 may extract the texts T1 from the source image G1 and the texts T2 from the source image G2 and display both of the extracted texts, thus omitting the image including the image region in each of the display fields R, instead of displaying the source image G1 and the source image G2 side by side.

Figure 8A:
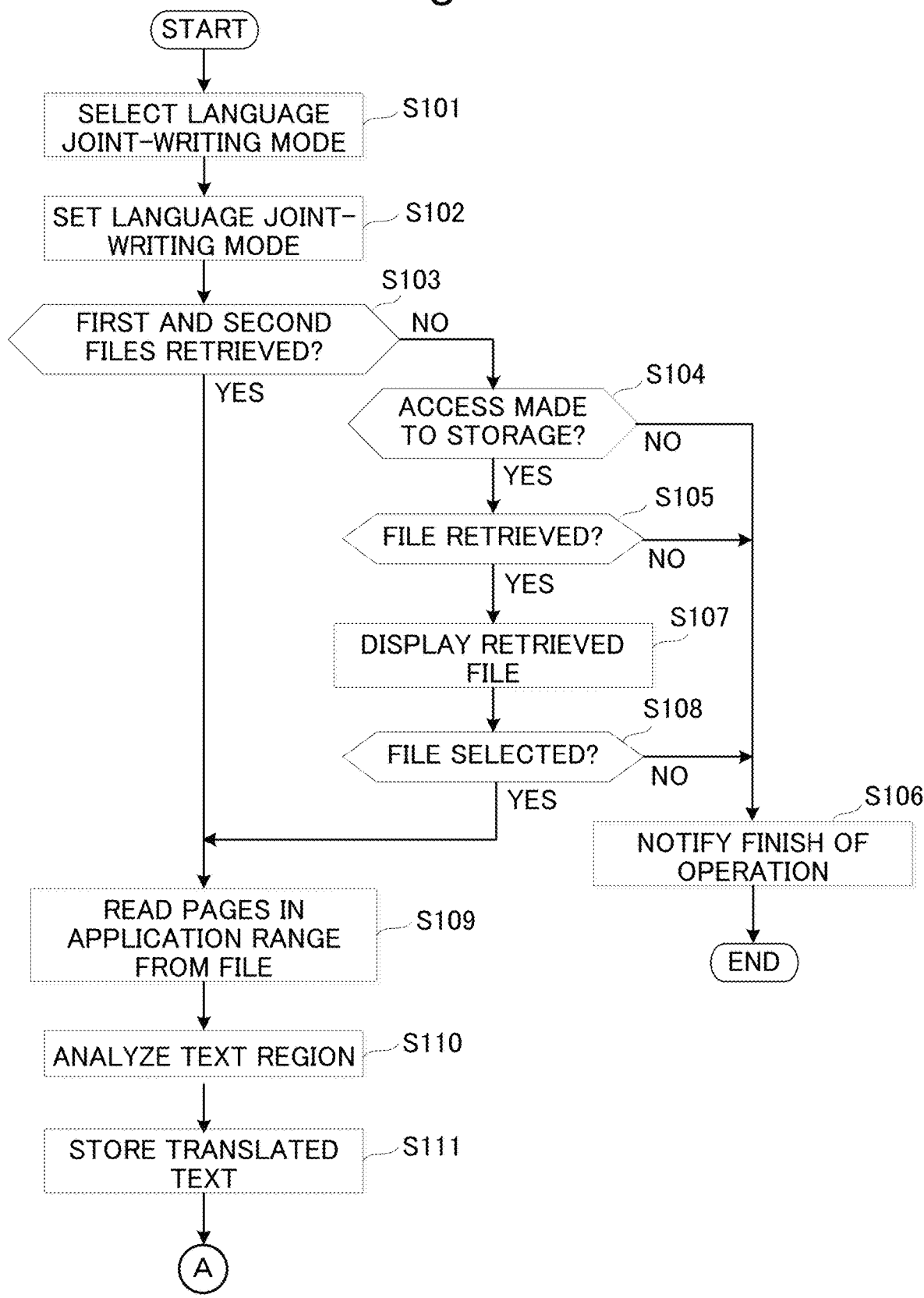
FIG. 8A is a flowchart showing a process of searching the first file and the second file to detect a difference between the text in the first file and the text in the second file, and outputting the difference.
Figure 8B:
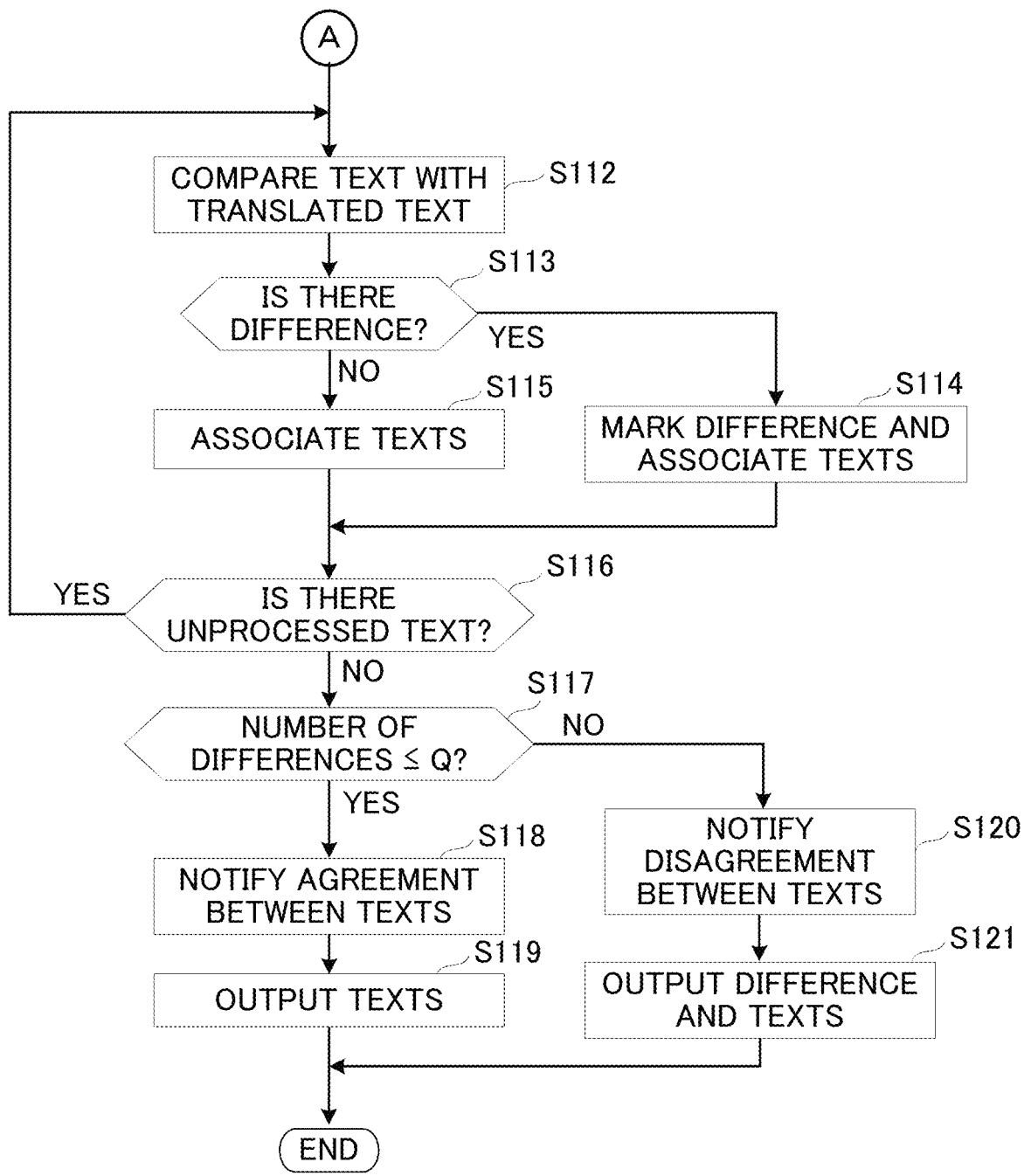
FIG. 8B is a flowchart showing a process that follows the process of FIG. 8A.

Hereunder, a process of searching the first file and the second file, to detect and output a difference between the text in the first file and the text in the second file as above, will be described with reference to the flowcharts shown in FIG. 8A and FIG. 8B.

Figure 9:
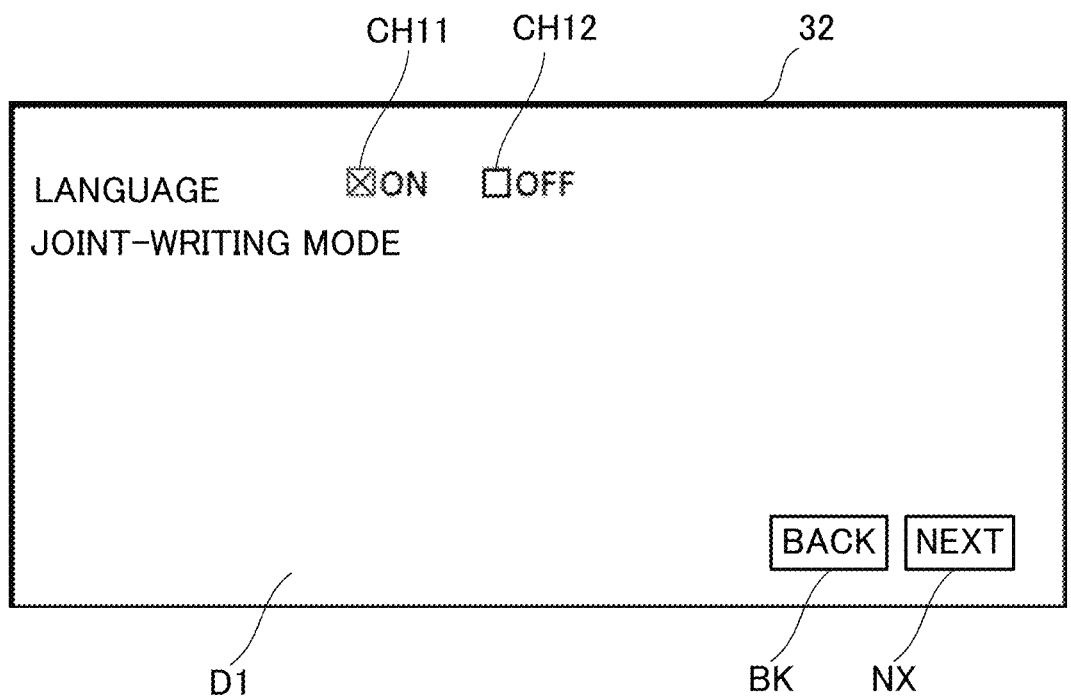
FIG. 9 is a schematic drawing showing a selection screen of a language joint-writing mode, displayed on a display unit.

First, when the user inputs an instruction to display a setup screen D1 in the language joint-writing mode as shown in FIG. 9, through the operation unit 34 and the touch panel 35, the controller 41 causes, through the display controller 42, the display unit 32 to display the setup screen D1, according to the instruction. In the setup screen D1 of the language joint-writing mode, check boxes CH11 and CH12 for instructing to turn on and off the language joint-writing mode, a back key BK, and a next key NX are displayed. When the user puts a check in the check box CH11 to turn on the language joint-writing mode, and presses the next key NX through the operation unit 34 or touch panel 35, the controller 41 accepts the setting of the language joint-writing mode (step S101).

Figure 10:
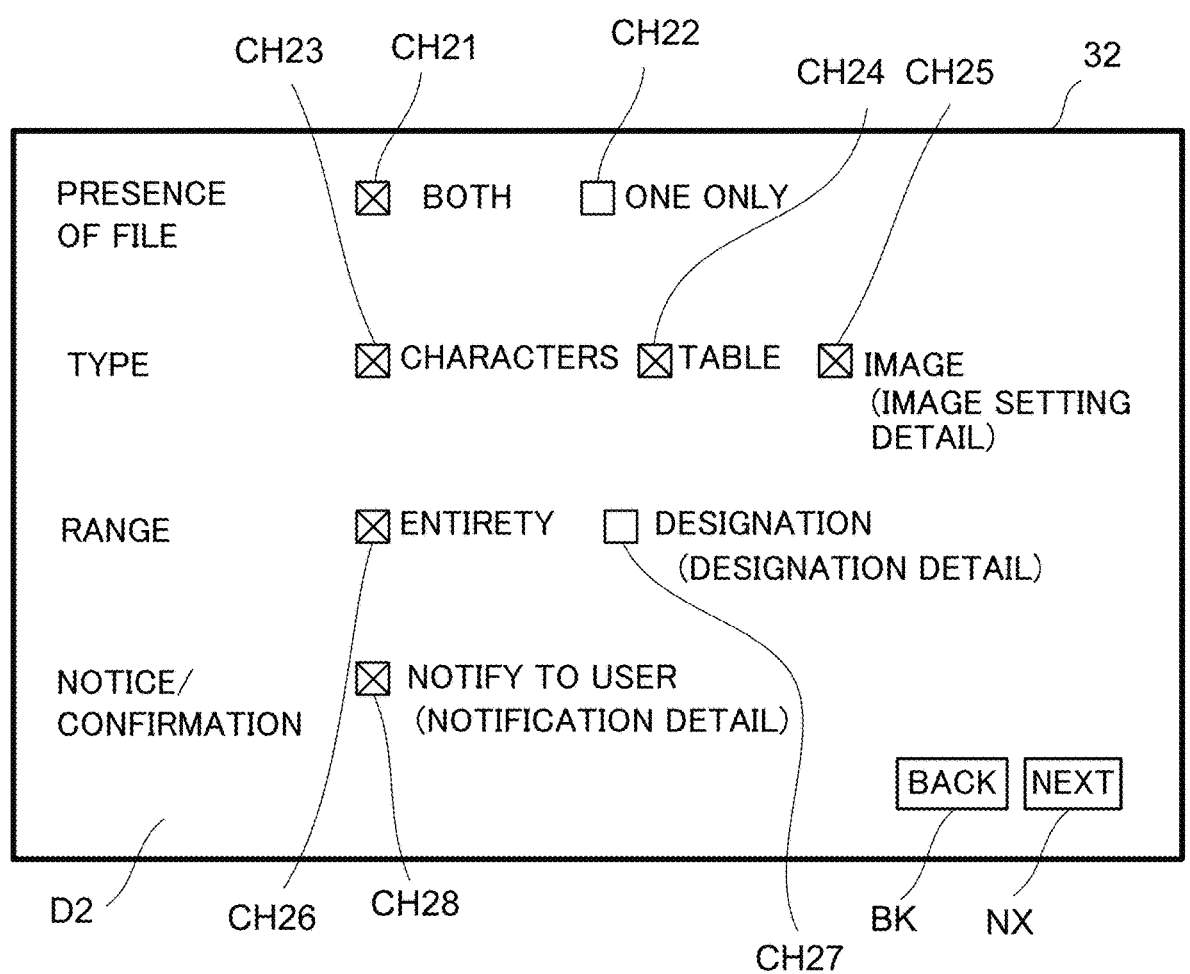
FIG. 10 is a schematic drawing showing a set-up screen of the language joint-writing mode, displayed on the display unit.

When the controller 41 accepts the language joint-writing mode, the display controller 42 turns off the set-up screen D1, and instead causes the display unit 32 to display a set-up screen D2 of the language joint-writing mode, as shown in FIG. 10 (step S102). The set-up screen D2 of the language joint-writing mode includes check boxes CH21 and CH22 for indicating whether the first file and the second file, respectively containing texts that are different in language from each other, are to be handled, check boxes CH23, CH24, and CH25 for indicating whether the source images in the first file and the second file include the text region, the image region, and the table region, respectively, check boxes CH26 and CH27 for specifying the application range of the language joint-writing mode (e.g., pages of the source image), a check box CH28 for instructing whether a difference between the text in the first file and the text in the second file is to be notified, the back key BK, and the next key NX.

FIG. 10 illustrates the set-up screen D2 of the language joint-writing mode in which, as default settings, the check box CH21 for indicating that both of the first file and the second file are to be handled is selected by the user, a check is put in each of the check boxes CH23, CH24, and CH25 for indicating that the source image in the first file and the second file includes the text region, the image region, and the table region, the check box CH26 for indicating that the language joint-writing mode is to be applied to the entirety of the source image is selected, and a check is put in the check box CH28 for indicating that the difference between the text in the first file and the text in the second file is to be notified. When the user puts a check in any desired check box through the operation unit 34 or touch panel 35, the instruction corresponding to the selected check box is inputted, and accepted by the controller 41.

When the user presses the next key NX through the operation unit 34 or touch panel 35, the controller 41 receives the input of the instruction to execute the language joint-writing mode according to the settings specified on the set-up screen D2, thereby accepting the instruction to execute the language joint-writing mode.

When the user designates, through the operation unit 34 or touch panel 35, the first file and the second file respectively including texts that are different in language, by inputting the name of the first file and the name of the second file, the searcher 44 retrieves the first file and the second file from the storage unit 38 (step S103). Alternatively, the searcher 44 may retrieve the first file from the storage unit 38 when the user designates the first file by inputting the name thereof through the operation unit 34 or touch panel 35, and further retrieve the second file related to the first file from the storage unit 38, for example on the basis of the name of the first file. In addition, the display controller 42 may cause the display unit 32 to display a list including a plurality of files stored in advance in the storage unit 38, to allow the user to select and designate first file and the second file, or the first file alone through the operation unit 34 or touch panel 35, and the controller 41 may accept such designation.

In the case where the searcher 44 fails to retrieve the first file and the second file from the storage unit 38, or retrieves only the first file from the storage unit 38 (No at step S103), the searcher 44 searches the storage on the network, for the first file and the second file, or for the second file related to the first file, on the basis of the name thereof (step S104 and S105). In the case where the searcher 44 fails to make access to the storage (No at step S104), or fails to retrieve the first file and the second file from the storage (or fails to retrieve the second file from the storage on the network, in the case where only the first file has been retrieved from the storage unit 38 at step S103) (No at step S105), the display controller 42 causes the display unit 32 to display a message to the effect that the language joint-writing mode is finished (step S106), and the operation of FIG. 8A and FIG. 8B is finished.

In the case where, upon making access to the storage (Yes at step S104), the searcher 44 successfully retrieves the first file and the second file from the storage (or retrieves the second file from the storage, in the case where only the first file has been retrieved from the storage unit 38 at step S103) (Yes at step S105), the display controller 42 causes the display unit 32 to display the first file and the second file (or only the second file, in the case where only the first file has been retrieved from the storage unit 38 at step S103) (step S107). At this point, in the case where the user does not select the first file and the second file (or only the second file, in the case where only the first file has been retrieved from the storage unit 38 at step S103) (No at step S108), the display controller 42 causes the display unit 32 to display a message to the effect that the language joint-writing mode is finished (step S106), and the operation of FIG. 8A and FIG. 8B is finished.

In contrast, in the case where the user selects the first file and the second file (or only the second file, in the case where only the first file has been retrieved from the storage unit 38 at step S103), through the operation unit 34 or touch panel 35, and the controller 41 accepts such selection (Yes at step S108), the searcher 44 acquires both of the first file and the second file retrieved from the storage (or only the second file, in the case where only the first file has been retrieved from the storage unit 38 at step S103).

Therefore, in the case where the searcher 44 retrieves the first file and the second file upon searching the storage unit 38 (Yes at step S103), or where the controller 41 accepts the selection of the first file and the second file (or only the second file, in the case where only the first file has been retrieved from the storage unit 38 at step S103) inputted by the user through the operation unit 34 or touch panel 35 (Yes at step S108), both of the first file and the second file (or only the second file, in the case where only the first file has been retrieved from the storage unit 38 at step S103) are acquired.

When the user inputs the application range of the language joint-writing mode by operating the operation unit 34 on the set-up screen D2, the controller 41 accepts the designation of the application range. The searcher 44 retrieves the source image on the page(s) corresponding to the application range from the first file in the storage unit 38, according to the instruction of the application range and stores the retrieved source image in the image memory 39, and also retrieves the source image on the page(s) corresponding to the application range from the second file in the storage unit 38, and stores the retrieved source image in the image memory 39 (step S109).

The layout analyzer 45 performs the layout analysis with respect to each of the source image in the first file and the source image of the second file in the image memory 39, to thereby sequentially identify the text region, the image region, and the table region in each of the source images. Then the layout analyzer 45 extracts the text from each text region by the character text conversion, and identifies the language of the characters of the extracted text (step S110). The layout analyzer 45 also identifies the correspondence between the texts in the text region in the first file and the texts in the text region in the second file, on the basis of the respective positions of the text regions in the source image in the first file, and the respective positions of the text regions in the source image in the second file.

The translator 46 translates the texts in the second file into the same language as that of the texts in the first file, to thereby generate the respective translated texts, and stores the translated texts in the storage unit 38, in association with the corresponding texts in the second file (step S111).

The comparator 47 identifies the texts in the second file respectively corresponding to the texts in the first file, on the basis of the correspondence identified by the layout analyzer 45, and compares between the texts in the first file and the translated texts generated from the texts in the second file respectively corresponding to the texts in the first file (step S112). The comparator 47 sequentially decides, through such comparison, whether there is a difference between the text in the first file and the text in the second file (step S113).

In the case where there is a difference (Yes at step S113), the comparator 47 marks the difference on the text in the first file or the text in the second file stored in the storage unit 38, and associates the corresponding texts (step S114). For example, the comparator 47 extracts a word not included in the text in the first file from the translated text, and detects a word in the text in the second file corresponding to the extracted word, as the difference, and then associates the text in the first file with the text in the second file, by marking the detected word in the text in the second file. Alternatively, the comparator 47 may detect a word in the text in the first file not included in the translated text, as the difference, and associate the text in the first file with the text in the second file, by marking the detected word in the text in the first file.

In the case where there is no difference between the text in the first file and the text in the second file (No at step S113), the comparator 47 associates the text in the first file with the text in the second file stored in the storage unit 38, without indicating the difference (step S115).

Then the comparator 47 decides whether any of the texts in the first file has not yet been compared with the translated text (step S116). Upon deciding that there is such a text (Yes at step S116), the comparator 47 repeats the operation of step S112 to step S116, to compare the remaining text in the first file with the translated text. Upon deciding that there is no such text (No at step S116), the comparator 47 finishes the operation of step S112 to step S116, and proceeds to step S117.

When the operation of step S112 to step S116 is finished, the controller 41 looks up the texts in the first file and the respectively associated texts in the second file, stored in the storage unit 38, and counts the number of words detected as the difference at step S114, with respect to the texts in the first file and the respectively associated texts in the second file. The controller 41 then decides whether the number of words is equal to or fewer than a predetermined reference value Q (Q=0 or an integer; in this embodiment, 0) (step S117). In the case where the controller 41 decides that the number of words is equal to or fewer than the reference value Q (Yes at step S117), the display controller 42 causes the display unit 32 to display a message to the effect that the texts in the first file and the texts in the second file agree with each other (step S118). The outputter 48 creates an image including both of the texts in the first file and the texts in the second file, and outputs the image (step S119).

In contrast, in the case where the controller 41 decides that the number of words exceeds the reference value Q (No at step S117), the display controller 42 causes the display unit 32 to display a message to the effect that the texts in the first file and the texts in the second file disagree (step S120). The outputter 48 creates an image including both of the texts in the first file and the texts in the second file, with each of the words representing the difference marked on the text in the first file, or on the text in the second file, and outputs such image (step S121).

In the case where the controller 41 makes the mentioned decision at step S117, with the predetermined reference value Q set to an integer such as 5, instead of 0, the display controller 42 causes the display unit 32 to display the message to the effect that the texts in the first file and the texts in the second file agree, when the number of different words is equal to or fewer than 5. Although one of sentences of different languages in translated and converted into the same language, the content of the converted sentence may not always perfectly agree with the counterpart sentence. Therefore, modifying thus the reference value Q allows the criterion for decision of the agreement between the text in the first file and the text in the second file to be adjusted to a level required by the user.

The operations executed by the outputter 48, to output the texts in the first file and the texts in the second file, are as illustrated in FIG. 3 to FIG. 7. For example, the outputter 48 decides whether the number of image regions in the source image in the first file, or the number of image regions in the source image in the second file is equal to or fewer than a predetermined specified value (e.g., 3). Upon deciding that the number of image regions exceeds the specified value, the outputter 48 retrieves the source image in the first file and the source image in the second file from the image memory 39 as shown in FIG. 3, and also sequentially retrieves the words detected as difference from the storage unit 38. The outputter 48 then creates an image including both of the retrieved source images, with the words detected as the difference underlined or framed, or displayed in a different color, in the text in the source images.

In contrast, when the outputter 48 decides that the number of image regions in the source image in the first file, or the number of image regions in the source image in the second file is equal to or fewer than the specified value, the outputter 48 extracts the texts in Japanese from the source image in the first file, and the texts in English from the source image in the second file, and also sequentially retrieves the words detected as difference from the storage unit 38. Then the outputter 48 creates an image including both of the extracted texts, with the words detected as the difference underlined or framed, or displayed in a different color, in the text in the source images.

Alternatively, the outputter 48 may retrieve the source image in the first file and the source image in the second file from the image memory 39 as shown in FIG. 4, and also sequentially retrieve the words detected as difference from the storage unit 38. The outputter 48 may then create an image including both of the retrieved source images, with the words detected as the difference in the text in the source images underlined or framed, or displayed in a different color. Otherwise, the outputter 48 may create an image in which the text in the first file and the corresponding text in the second file are aligned in the up-down direction as a pair, with respect to each of the texts in the first file, as shown in FIG. 5A, with the words sequentially retrieved from the storage unit 38 as the difference underlined or framed, or displayed in a different color, in the text in the source images.

The outputter 48 may also create an image as shown in FIG. 6, in which the text in the first file and the text in the second file are located side by side as a pair, with the words detected as the difference underlined or framed, or displayed in a different color, in the text in the first file or in the text in the second file.

Further, the outputter 48 may create an image in which the table regions in the source image in the first file and the table regions in the source image in the second file are located side by side as shown in FIG. 7, with the words detected as the difference underlined or framed, or displayed in a different color, in the text in the first file or in the text in the second file.

Here, translating a text into a text of a different language, and storing the translated text in a corresponding file, allows the users who respectively use different languages to read the text of substantially the same content, by properly selecting the file.

However, in the case where the text in one of such files is updated, without the text in other files being updated, a difference is produced among the texts in the respective files, and therefore the concordance in content among the texts in the respective files is lost. Accordingly, a technique to detect the difference in such a case is required.

However, a technique to compare between texts of different languages, and detect a difference between the texts, is yet unknown.

In this embodiment, the text in the second file is translated into the same language as that of the text in the first file, thus to generate a translated text, and a difference between the text in the first file and the text in the second file is detected, through comparison between the text in the first file and the translated text generated from the second file. Thus, the texts of different languages can be compared, and a difference in content between the texts can be detected. Therefore, the difference between the texts that are different in language can be easily confirmed. The arrangement according to this embodiment enables, for example when the text in only one of the files is updated, the user to check whether the update is reflected in both of the texts. In addition, since the detected difference is visually displayed, the user can also check the accuracy of the translated text, with respect to the counterpart text.

According to this embodiment, in addition, the outputter 48 creates an image in which both of the texts are displayed, and the difference is marked in one of the texts, which facilitates the user to compare those texts upon viewing the outputted image.

Further, according to this embodiment, the outputter 48 creates the image including both of the source image G1 and the source image G2, when the number of image regions in the source image in the first file, or the number of image regions in the source image in the second file exceeds the specified value. Such an arrangement prevents the appearance of the source image G1 and the source image G2 from collapsing, because of the image regions not being displayed. In addition, the outputter 48 extracts the text T1 in Japanese in the source image G1 and the text T2 in English in the source image G2 and displays these texts together, instead of displaying the source image G1 and the source image G2 together, when the number of image regions is equal to or fewer than the specified value. Therefore, provided that the appearance of the source image G1 and source image G2 is kept from collapsing despite the image regions not being displayed, the display of the image regions can be omitted, so as to facilitate the user to recognize the difference between the text T1 and the text T2.

Although the translator 46 is configured to generate the translated text from the second file in the foregoing embodiment, the translator 46 may generate the translated text from the text in the first file, for comparison between the text in the second file as it is, and the translated text of the first file.

In addition, the layout analyzer 45 is configured to identify the text region in each of the source images stored in the first file and the second file in the foregoing embodiment, so that the texts in the first file and the second file, extracted from the text regions identified, are compared. Instead, the first file and the second file may contain the text data in advance, without the layout analyzer 45 being involved, so that the comparator 47 compares between the texts, with respect to the portion corresponding to the text data.

Naturally, various types of languages may be applied to the text in the first file and the text in the second file.

Figure 5B:
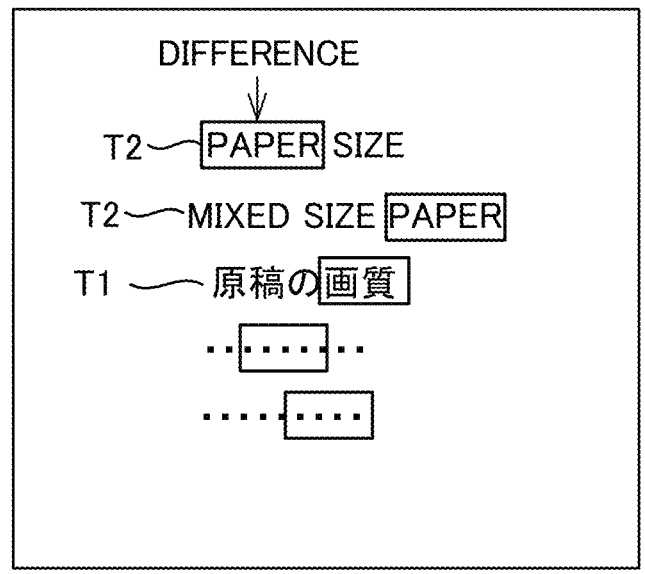
FIG. 5B is a schematic drawing showing an image indicating only the texts detected as difference, in Japanese texts in the first file and English texts in the second file.

The outputter 48 may count the number of differences, and create an image in which, when the number of differences is equal to or fewer than a predetermined threshold, text in the first file and text in the second file are both displayed, with each of the differences marked on either text. When the number of differences exceeds the threshold, however, the outputter 48 may create an image in which, as shown in FIG. 5B, only the text on which the difference is marked, with respect to each of the differences, out of the text in the first file and text in the second file on one of which the difference is marked. In this case, the user recognizes only the text on which the difference is marked, when there are many differences, thus easily confirming the difference.

Further, the outputter 48 may create an image including both of the text in the first file and text in the second file, when the difference is marked on one of the texts corresponding to each other, but skip the creation of the image, when the difference is marked on neither of the text in the first file and text in the second file corresponding to each other.

The user may be allowed to set as desired the direction in which the text in the first file and text in the second file are aligned as a pair. For example, two check boxes for selecting the alignment direction between the up-down direction and the left-right direction may be displayed in the set-up screen D2 of the language joint-writing mode shown in FIG. 10, for the user to select either check box through the operation unit 34 or touch panel 35. The outputter 48 then accepts the alignment direction of the text in the first file and text in the second file indicated by the selected check box, and sets the alignment direction to one of the up-down direction and the left-right direction, according to the alignment direction accepted.

The user may also be allowed to set the order of the location of the text in the first file and text in the second file, in the set-up screen D2 of the language joint-writing mode.

Further, the outputter 48 may change the alignment direction of the text in the first file and text in the second file, from the left-right direction to the up-down direction, in the case where the length of at least one of the texts in the left-right direction exceeds a predetermined length when these texts are aligned in the left-right direction. In this case, the alignment direction of the texts is changed to the up-down direction, when the length of at least one of the texts in the left-right direction is too long to display the texts side by side in the left-right direction, and therefore the joint writing of the texts can be maintained.

The configurations and processings described with reference to FIG. 1 to FIG. 10 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image processing apparatus comprising:
an operation unit through which an instruction of a user is inputted;
a storage unit in which a plurality of files are stored; and
a control unit including a processor, the control unit being configured to act, when the processor executes a control program, as:
a searcher that searches a first file and a second file, each including a text that is different in language from each other;
a translator that generates a translated text of the second file, by translating the text in the second file into a same language as a language of the corresponding text in the first file;
a comparator that compares between the text in the first file and the translated text generated from the second file, and detects a difference between the text of the first file and the text of the second file, through the comparison; and
an outputter that executes a process for outputting the difference detected by the comparator,
wherein the first file and the second file each include a plurality of texts,
the searcher searches, when only the first file is designated through the operation unit, the storage unit to retrieve the first file, and searches the storage unit to retrieve the second file related to the first file,
the translator generates the translated text of each of the texts in the second file, by translating the text in the second file into a same language as the language of the corresponding text in the first file,
the comparator compares between the texts in the first file and the respectively corresponding translated texts of the second file, and detects a difference between each of the texts in the first file and a corresponding text in the second file, and
the outputter creates, when a number of the differences is equal to or fewer than a predetermined threshold, a first image including both of the texts in the first file and the texts in the second file, with the difference marked on the text in the first file or the text in the second file, with respect to each of the differences, and executes a process for outputting the created first image, and
puts a mark indicating the difference, when the number of the differences exceeds the threshold, on the text in the first file or the text in the second file, with respect to each of the differences, creates a second image including only the texts on which the difference is marked, and executes a process for outputting the created second image.

2. The image processing apparatus according to claim 1, wherein the comparator extracts a word not included in the text in the first file from the translated text of the second file, and detects a word in the text in the second file corresponding to the extracted word, as the difference.

3. The image processing apparatus according to claim 1, wherein the comparator extracts a word not included in the translated text of the second file, from the corresponding text in the first file, and detects the extracted word as the difference.

4. The image processing apparatus according to claim 1, wherein the control unit further acts as a layout analyzer that identifies a text region and an image region in each of source images included in the first file and the second file, and extracts the text from the text region identified.

5. The image processing apparatus according to claim 4, wherein the layout analyzer identifies correspondence between the text in the first file and the text in the second file, on a basis of a position of the text region in the source image in the first file, and a position of the text region in the source image in the second file.

6. The image processing apparatus according to claim 1, further comprising a display unit, wherein the control unit further acts as a display controller that controls a displaying operation of the display unit, and the display controller causes the display unit to:

display, when the number of the differences is equal to or less than a predetermined reference value, a message to an effect that the text in the first file and the text in the second file agree; and display, when the number of the differences exceeds the predetermined reference value, a message to an effect that the text in the first file and the text in the second file disagree.

7. The image processing apparatus according to claim 1, wherein the searcher searches, when only the first file is designated through the operation unit, the storage unit to retrieve the first file, and searches the storage unit to retrieve the second file related to the first file, on a basis of a name of the first file.

8. The image processing apparatus according to claim 1, further comprising an image forming unit that forms an image on a recording sheet, wherein the outputter causes the image forming unit to form the created first image or the created second image on the recording sheet.

9. The image processing apparatus according to claim 1, further comprising a communication unit that makes communication with a terminal device through a network, wherein the outputter causes the communication unit to transmit the created first image or the created second image to the terminal device, through the network.

* * * * *